United States Patent
Jung et al.

(10) Patent No.: US 8,396,016 B2
(45) Date of Patent: Mar. 12, 2013

(54) METHOD AND APPARATUS FOR TRANSMITTING AND RECEIVING DATA IN A CODE DIVISION MULTIPLE ACCESS SYSTEM

(75) Inventors: Jung-Soo Jung, Seongnam-si (KR); Dae-Gyun Kim, Seongnam-si (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 11/546,575

(22) Filed: Oct. 12, 2006

(65) Prior Publication Data

US 2007/0081500 A1 Apr. 12, 2007

(30) Foreign Application Priority Data

Oct. 12, 2005 (KR) .................. 10-2005-0096298
Dec. 2, 2005 (KR) .................. 10-2005-0116958

(51) Int. Cl.
*H04H 20/71* (2008.01)
*H04B 7/216* (2006.01)
*H04W 4/00* (2009.01)

(52) U.S. Cl. .................. 370/312; 370/335; 455/434

(58) Field of Classification Search ........... 370/335, 370/312; 455/434
See application file for complete search history.

(56) References Cited

U.S. PATENT DOCUMENTS

| 7,110,349 | B2 | 9/2006 | Branlund et al. |
| 2001/0053140 | A1 | 12/2001 | Choi et al. |
| 2003/0031230 | A1 | 2/2003 | Kwon et al. |
| 2003/0063606 | A1 | 4/2003 | Odenwalder et al. |
| 2003/0072296 | A1 | 4/2003 | Odenwalder et al. |
| 2004/0160984 | A1* | 8/2004 | Sidhushayana et al. ...... 370/474 |
| 2004/0252655 | A1 | 12/2004 | Lim et al. |

(Continued)

FOREIGN PATENT DOCUMENTS

| JP | 2004-511995 A | 4/2004 |
| KR | 10-20050041857 | 5/2005 |

(Continued)

OTHER PUBLICATIONS

XP 002375877, Detailed Description for QUALCOMM's FL Proposal for HRPD Rev. A Enhancement, C30-DOAH-20031013-205, 3$^{rd}$ Generation Partnership Project 2 "3GPP2", Source: Naga Bhushan and Mingxi Fan, QUALCOMM Incorporated, 8 pages.

(Continued)

*Primary Examiner* — Steven Lim
(74) *Attorney, Agent, or Firm* — Roylance, Abrams, Berdo & Goodman, LLP

(57) ABSTRACT

A method and apparatus are provided for transmitting data to access terminals by an access node in a Code Division Multiple Access (CDMA) system operating at least 128 Medium Access Control Identifiers (MAC IDs) in one sector. A preamble set for transmitting a multi-user packet (MUP) is configured to a specific access terminal, information on the preamble set is provided to the terminal, and data is transmitted to an access terminal having a MAC ID of 128 or higher using a preamble corresponding to the MAC ID. If a specific access terminal has a MAC ID of 128 or higher, the preamble set includes at least one preamble with which the access terminal determines whether the MUP is received. The access node provides information on the preamble set to the access terminal during session configuration.

33 Claims, 6 Drawing Sheets

U.S. PATENT DOCUMENTS

| | | | |
|---|---|---|---|
| 2005/0094675 A1 | 5/2005 | Bhushan et al. | |
| 2005/0281278 A1* | 12/2005 | Black et al. | 370/412 |
| 2006/0171347 A1* | 8/2006 | Attar et al. | 370/328 |
| 2006/0176881 A1 | 8/2006 | Ma et al. | |
| 2007/0081500 A1* | 4/2007 | Jung et al. | 370/335 |

FOREIGN PATENT DOCUMENTS

| | | |
|---|---|---|
| KR | 10-20060081329 | 12/2006 |
| RU | 2204220 C2 | 5/2003 |
| TW | I234940 | 6/2005 |
| TW | I234954 | 6/2005 |
| WO | WO 01/63951 A2 | 8/2001 |
| WO | WO 2004/075495 A1 | 9/2004 |

OTHER PUBLICATIONS

XP 040265121, Enhanced Forward Traffic Channel MAC Protocol, 3GPP2, Source: Rashid Attar and Naga Bhushan QUALCOMM, Incorporated, 31 pages.

* cited by examiner

METHOD AND APPARATUS FOR TRANSMITTING AND RECEIVING DATA IN A CODE DIVISION MULTIPLE ACCESS SYSTEM

CROSS-REFERENCE TO RELATED APPLICATIONS

This application claims the benefit under 35 U.S.C. §119 (a) of Korean Patent Application Nos. 2005-96298 and 2005-116958, filed Oct. 12, 2005, and Dec. 2, 2005, respectively, in the Korean Intellectual Property Office, the entire contents of both of which are hereby incorporated by reference.

BACKGROUND OF THE INVENTION

1. Field of the Invention

The present invention relates generally to a method and system for transmitting and receiving data in a mobile communication system. More particularly, the present invention relates to a method and apparatus for transmitting and receiving data to/from a plurality of users in a Code Division Multiple Access (CDMA) system using multiple carriers (MC).

2. Description of the Related Art

Recently, a great deal of research is being carried out on high-speed data transmission in CDMA mobile communication systems. A typical mobile communication system having a channel structure for high-speed data transmission includes a 1× EVolution Data Only (1×EVDO) system. The 1×EVDO system is a mobile communication system specified in the 3rd Generation Partnership Project 2 (3GPP2) for complementing data communication of an Interim Standard-2000 (IS-2000) system.

A forward channel of the 1×EVDO system includes a pilot channel, a forward Medium Access Control (MAC) channel, a forward traffic channel, and a forward control channel. The forward channel is transmitted to each access terminal (AT) by Time Division Multiplexing (TDM). A bundle of the TDM-transmitted signals is called a 'burst.'

The forward traffic channel transmits user data packets, and the forward control channel transmits control messages and user data packets. The forward MAC channel is used for reverse rate control, delivery of power control information, and designation of a forward data transmission channel.

A reverse channel of the 1×EVDO system, unlike the forward channel, has a channel with a unique identification code for each individual access terminal, and the reverse channel for each individual access terminal includes a pilot channel, a reverse traffic channel, an access channel, a Data Rate Control (DRC) channel, and a Reverse Rate Indicator (RRI) channel. The reverse traffic channel transmits user data packets, the DRC channel is used for indicating a forward rate supportable by an access terminal, and the RRI channel is used for indicating reverse direction data channel transmission rate. The access channel is used when an access terminal transmits messages or traffic to an access node (AN) before the traffic channel is connected.

The architecture of a 1×EVDO system will now be described with reference to FIG. 1.

FIG. 1 is a diagram schematically illustrating architecture of a conventional 1×EVDO system.

Referring to FIG. 1, the 1×EVDO system includes a Packet Data Service Node (PDSN) 40, connected to the Internet network 50, for transmitting high-speed packet data to an access node 20, and an Access Node Controller (ANC) 30 for controlling the access node 20. The access node 20 wirelessly communicates with a plurality of access terminals (ATs) 10, and transmits the high-speed packet data to an access terminal 10a having the highest rate.

For rate control of the forward channel, the access terminal 10 measures the received strength of a pilot transmitted by the access node 20, and determines its desired forward data rate based on the measured received strength of the pilot. The access terminal 10 transmits DRC information corresponding to the determined forward data rate to the access node 20 through a DRC channel. The access node 20 then receives the DRC information, and can transmit packet data only to the access terminal 10a having a good channel state at the rate reported by the access terminal 10a. Although a mapping relationship between the forward channel state and the DRC information is subject to change depending on implementation, it is generally fixed in the access terminal manufacturing process.

Table 1 shows a relationship between a DRC reported by an access terminal and its associated rate and transmission format.

TABLE 1

| DRC | Rate (kbps) | Num of Transmissions (slots) | Transmission Format |
| --- | --- | --- | --- |
| 0x0 | 0 | 16 | (1024, 16, 1024) |
| 0x1 | 38.4 | 16 | (1024, 16, 1024) |
| 0x2 | 76.8 | 8 | (1024, 8, 512) |
| 0x3 | 153.6 | 4 | (1024, 4, 256) |
| 0x4 | 307.2 | 2 | (1024, 2, 128) |
| 0x5 | 307.2 | 4 | (2048, 4, 128) |
| 0x6 | 614.4 | 1 | (1024, 1, 64) |
| 0x7 | 614.4 | 2 | (2048, 2, 64) |
| 0x8 | 921.6 | 2 | (3072, 2, 64) |
| 0x9 | 1228.8 | 1 | (2048, 1, 64) |
| 0xa | 1228.8 | 2 | (4096, 2, 64) |
| 0xb | 1843.2 | 1 | (3072, 1, 64) |
| 0xc | 2457.6 | 1 | (4096, 1, 64) |
| 0xd | 1536 | 2 | (5120, 2, 64) |
| 0xe | 3072 | 1 | (5120, 1, 64) |

Referring to Table 1, the transmission format is expressed in the form of bit, slot, and chip preamble, for example, (1024, 16, 1024), which means that 1024-bit information is transmitted for 16 slots and a 1024-chip preamble is transmitted at the beginning of the transmission. An access node transmits data to each access terminal with a transmission format corresponding to a DRC value reported by the access terminal, and the access terminal attempts to receive a forward data channel only with the format corresponding to its reported DRC value. This agreement is made because for a data channel transmitted in the forward direction, there is no other channel to indicate its data rate. That is, when the access node transmits data using a transmission format other than the transmission format reported by the access terminal, there is no way to indicate the transmission format, so the access terminal cannot receive the data. Therefore, the access node always transmits data only with the transmission format corresponding to the DRC reported by the access terminal. For example, for the access terminal that transmitted DRC 0x01 through a DRC channel, the access node transmits data using a transmission format (1024, 16, 1024) corresponding to the DRC value, and the access terminal attempts to receive data only with this format.

The access node, when transmitting data to the access terminal, indicates which user should receive the forward data, using a preamble having the length specified in the transmission format. This preamble is generated by spreading a predefined bit sequence using a Walsh code corresponding to a Medium Access Control Identifier (MAC ID) assigned to each access terminal by the access node. In order to determine whether to receive the data, the access terminal receives as many chips as the preamble length corresponding to its reported transmission format, despreads the received chips using the Walsh code corresponding to its own MAC ID, and compares whether the signal is equal to the predefined bit sequence in terms of strength and value.

The packet data that the access node transmits to one access terminal according to the received DRC information is called a "Single User Packet (SUP)." For general data service, the access node transmits data using the SUP. The Voice over Internet Protocol (VoIP)-base data service, compared with the general data service, needs a lower transmission bandwidth of about 9.6 kbps. For a bandwidth of 9.6 kbps, data of only some 192 bits is transmitted every 20 ms. Transmitting such a small amount of data with the SUP having a minimum size of 1024 bits causes an unnecessary waste of the bandwidth. In order to prevent such a waste of resources in the wireless access section, a scheme of transmitting data for several users using one physical packet has been introduced Such a packet format is called a "Multi-User Packet (MUP)."

Table 2 shows a relationship between a DRC value and its associated rate and transmission format for the MUP.

TABLE 2

| DRC | Rate (kbps) | List of Associated Multi-User Transmission Formats |
|---|---|---|
| 0x0 | 0 | (128, 4, 256), (256, 4, 256), (512, 4, 256), (1024, 4, 256) |
| 0x1 | 38.4 | (128, 4, 256), (256, 4, 256), (512, 4, 256), (1024, 4, 256) |
| 0x2 | 76.8 | (128, 4, 256), (256, 4, 256), (512, 4, 256), (1024, 4, 256) |
| 0x3 | 153.6 | (128, 4, 256), (256, 4, 256), (512, 4, 256), (1024, 4, 256) |
| 0x4 | 307.2 | (128, 4, 256), (256, 4, 256), (512, 4, 256), (1024, 4, 256) |
| 0x5 | 307.2 | (128, 4, 256), (256, 4, 256), (512, 4, 256), (1024, 4, 256), (2048, 4, 128) |
| 0x6 | 614.4 | (128, 4, 256), (256, 4, 256), (512, 4, 256), (1024, 4, 256) |
| 0x7 | 614.4 | (128, 4, 256), (256, 4, 256), (512, 4, 256), (1024, 4, 256), (2048, 4, 128) |
| 0x8 | 921.6 | (128, 4, 256), (256, 4, 256), (512, 4, 256), (1024, 4, 256), (2048, 4, 128), (3072, 2, 64) |
| 0x9 | 1228.8 | (128, 4, 256), (256, 4, 256), (512, 4, 256), (1024, 4, 256), (2048, 4, 128) |
| 0xa | 1228.8 | (128, 4, 256), (256, 4, 256), (512, 4, 256), (1024, 4, 256), (2048, 4, 128), (3072, 2, 64), (4096, 2, 64) |
| 0xb | 1843.2 | (128, 4, 256), (256, 4, 256), (512, 4, 256), (1024, 4, 256), (2048, 4, 128), (3072, 2, 64) |
| 0xc | 2457.6 | (128, 4, 256), (256, 4, 256), (512, 4, 256), (1024, 4, 256), (2048, 4, 128), (3072, 2, 64), (4096, 2, 64) |
| 0xd | 1536 | (128, 4, 256), (256, 4, 256), (512, 4, 256), (1024, 4, 256), (2048, 4, 128), (3072, 2, 64), (4096, 2, 64), (5120, 2, 64) |
| 0xe | 3072 | (128, 4, 256), (256, 4, 256), (512, 4, 256), (1024, 4, 256), (2048, 4, 128), (3072, 2, 64), (4096, 2, 64), (5120, 2, 64) |

For each individual DRC reported by the access terminal, the 1×EVDO system defines a multi-user packet compatible with the DRC as shown in Table 2. For example, an access terminal that transmitted DRC 0×5 should receive a multi-user packet corresponding to a transmission format (128, 4, 256), (256, 4, 256), (512, 4, 256), (1024, 4, 256), (2048, 4, 128). This multi-user packet includes packet data for several users, and is transmitted together with an address of the access terminal that will receive each data packet. Upon receipt of the multi-user packet, the access terminal determines whether its own MAC ID is included in the received packet, and processes the corresponding user packet only when its own MAC ID is included in the received packet.

FIG. 2 is a diagram illustrating a structure of a multi-user packet used in a conventional 1×EVDO system. Referring to FIG. 2, a multi-user packet 200 is composed of a header 210 indicating a MAC ID, or an address, of a receiving access terminal and a length of data transmitted to the access terminal, a header delimiter 220 for defining a boundary between the header 210 and the other part, a payload 230 including data, a padding 240, and a trailer 250.

The header 210 of the multi-user packet delivers the information necessary for reception of the multi-user packet for each of the access terminals receiving the multi-user packet. This information is composed of a format field 211 containing format information of transmission data, a MAC ID 213, which is an identifier of a receiving access terminal, and a length field 215 indicating a length of the transmission data. Herein, the transmission data means transmission data in the multi-user packet 200, and will be referred to as a user packet.

The header 210, including N received information units for N receiving access terminals, is followed by the delimiter 220 of '00000000' for defining a boundary between the header part and the payload part. The delimiter 220 is followed by the payload 230, including user packets for N access terminals according to data format and length, and the order designated in the previously transmitted/received information. The padding 240 can be attached to the rear of the payload 230 when necessary, and the trailer 250 fixed to '00' is finally located at the rear of the padding 240, generating one multi-user packet 200.

The multi-user packet 200 is transmitted using a preamble assigned for transmission of a multi-user packet. Five preambles for the multi-user packet are defined according to rates of the multi-user packet. For example, one preamble (preamble #66) can be used for a low-rate multi-user packet (128, 4, 256), (256, 4, 256), (512, 4, 256), (1024, 4, 256), one preamble (preamble #67) can be used for a multi-user packet (2048, 4, 128), and different preambles (preambles #68, 69 and 70) can be used for a multi-user packet (3072, 2, 64), (4096, 2, 64), (5120, 2, 64), respectively. An access terminal, after reporting the DRC, monitors whether a preamble corresponding to the multi-user packet compatible with the transmitted DRC has arrived. Upon receipt of the preamble corresponding to the multi-user packet compatible with its own DRC, the access terminal decodes the multi-user packet, determines whether its own address is included in the header part, and reads and processes the user packet corresponding to the length specified in the header from the payload part if its own address is included in the header part.

With increasing demand for higher data rates in mobile communication systems, a multi-carrier EVDO system has been proposed to obtain a higher rate in the 1×EVDO system. The multi-carrier EVDO system, compared with a conventional EVDO system that exchanges data using a single carrier, assigns a plurality of carriers to one access terminal, thereby implementing a higher rate. Because each carrier can provide the maximum rate provided by a conventional 1×EVDO system, an access terminal in communication using multiple carriers in the ideal environment can use the maximum data rate, which is a function of the number of carriers.

In such a multi-carrier system, because one access terminal receives more than one carrier, the number of access terminals receiving data for each individual carrier increases on average. Accordingly, there is a need for a method capable of providing as many MAC IDs as the increasing number of access terminals for each individual carrier. In addition, for simple switching, the multi-carrier system should not greatly modify the physical transmission structure of the existing 1×EVDO system from the preexisting nationwide network.

SUMMARY OF THE INVENTION

It is, therefore, an object of exemplary embodiments of the present invention to provide a method and apparatus for more efficiently transmitting and receiving data to and from a plurality of access terminals in a Code Division Multiple Access (CDMA) system using multiple carriers (MC).

It is another object of exemplary embodiments of the present invention to provide a data transmission/reception method and apparatus capable of reducing overhead in a CDMA system using MC.

Exemplary embodiments of the present invention provide a method for transmitting data to access terminals by an access node in a Code Division Multiple Access (CDMA) system. The method includes configuring information on a preamble for a multi-user packet (MUP) to an access terminal, providing information on the preamble to the access terminal, and transmitting the MUP to an access terminal using a preamble corresponding to the access terminal.

In an exemplary implementation, the information on the preamble includes at least one preamble.

In an exemplary implementation, the access node provides the information on the preamble to the access terminal during session configuration.

In an exemplary implementation, the transmitting the MUP includes checking data rate control information (DRC) received from a access terminal, and transmitting the MUP using a preamble assigned to the access terminal.

In an exemplary implementation, the transmitting the MUP includes transmitting the MUP using a preamble determined according to the information on the preamble and size of the MUP to the access terminal.

Exemplary embodiments of the present invention provide an access node of a Code Division Multiple Access (CDMA) system. The access node includes a controller for configuring information on a preamble for transmitting a multi-user packet (MUP) to a access terminal, and checking data rate control information (DRC) received from the access terminal; a radio frequency (RF) unit for transmitting the information on the preamble for a multi-user packet (MUP) and the MUP using a preamble assigned to the access terminal based on the DRC to the access terminals.

In an exemplary implementation, the information on the preamble includes at least one preamble.

In an exemplary implementation, the controller transmits the MUP using a preamble determined according to the information on the preamble and size of the MUP to the access terminal.

Further exemplary embodiments of the present invention provide a method for receiving data by an access terminal in a Code Division Multiple Access (CDMA) system. The method includes receiving information on a preamble for a multi-user packet (MUP) from an access node, detecting whether there is any preamble assigned to the access terminal itself upon receipt of data from the access node, and decoding the MUP when there is any preamble assigned to the access terminal itself.

In an exemplary implementation, the method further includes determining a preamble according to the information on the preamble and size of the MUP to the access terminal.

In an exemplary implementation, the information on the preamble includes at least one preamble.

In an exemplary implementation, the access terminal receives the information on the preamble during session configuration with the access node.

In an exemplary implementation, the step of receiving an assigned MUP includes checking a preamble assigned to the access terminal itself when the access terminal is assigned a MAC ID of 128 or higher, and decoding the MUP when there is any preamble assigned to the access terminal itself.

Further exemplary embodiments of the present invention provide an access terminal of a Code Division Multiple Access (CDMA) system. The access terminal includes a radio frequency (RF) unit for transmitting data rate control information (DRC) to an access node, and receiving, from the access node, information on a preamble for a multi-user packet (MUP) assigned to the access terminal itself; a controller for controlling a DRC to be transmitted to the access node; and a decoder for, upon receipt of data from the access node, decoding an MUP when there is any preamble assigned to the access terminal itself.

In an exemplary implementation, the controller further determines a preamble according to the information on the preamble and size of the MUP to the access terminal.

In an exemplary embodiment, the information on the preamble includes at least one preamble.

In an exemplary embodiment, the controller receives the information on the preamble during session configuration with the access node.

In an exemplary embodiment, the controller checks a preamble assigned to the access terminal itself when the access terminal is assigned a MAC ID of 128 or higher, and decodes the MUP when there is any preamble assigned to the access terminal itself.

In an exemplary embodiment, the controller further checks a commonly assigned preamble of a MUP.

Further exemplary embodiments of the present invention provide a method for transmitting data to access terminals by an access node in a Code Division Multiple Access (CDMA) system. The method includes receiving data rate control information (DRC) from a access terminal, scheduling an access terminal for transmitting data with a multi-user packet (MUP) among the access terminals assigned the same preamble based on information on a preamble set for a MUP, and transmitting the received DRC and a MUP, and configuring the MUP, and transmitting the configured MUP using the preamble.

BRIEF DESCRIPTION OF THE DRAWINGS

The above and other objects, exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

Figure 1:
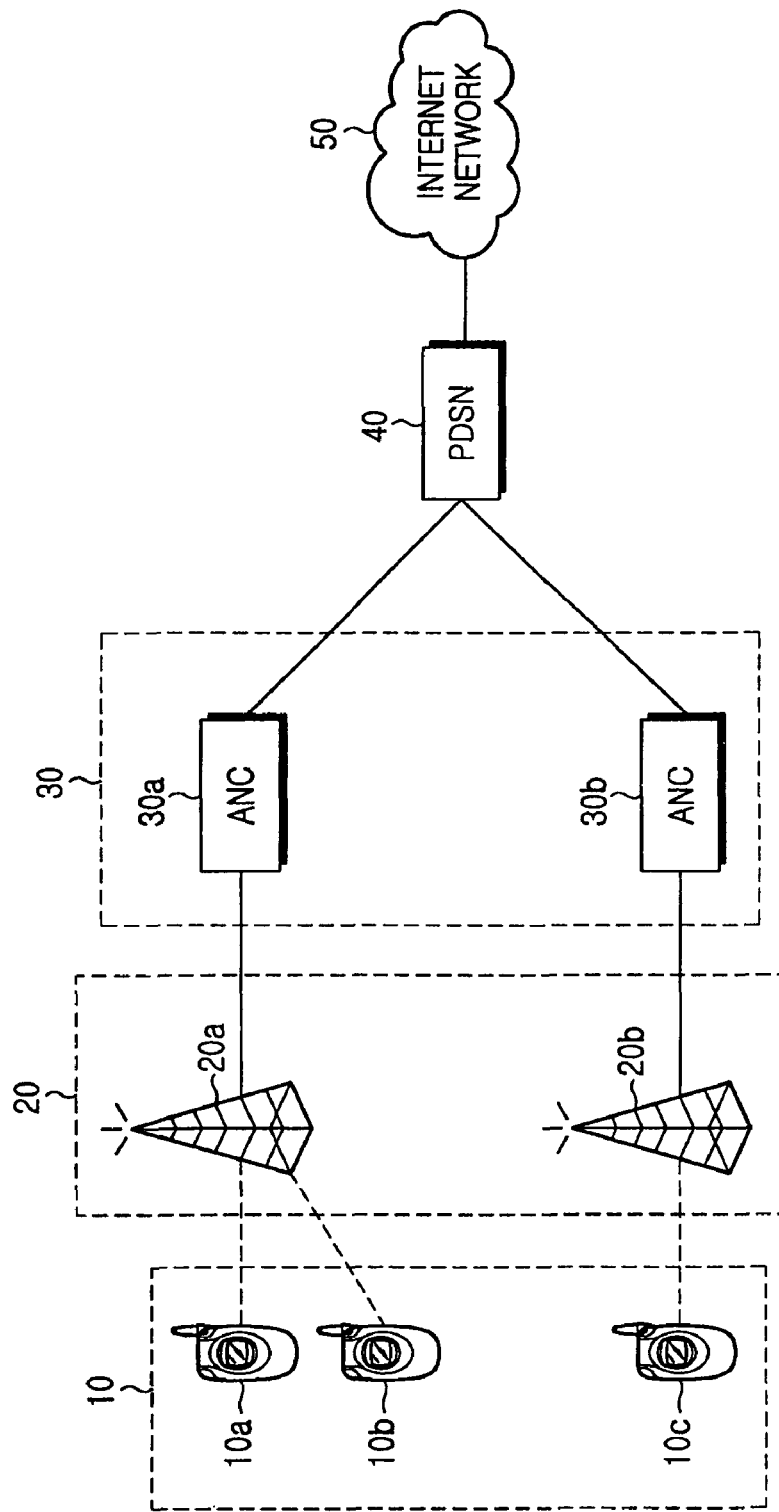
FIG. 1 is a diagram schematically illustrating architecture of a general 1×EVDO system.
Figure 2:
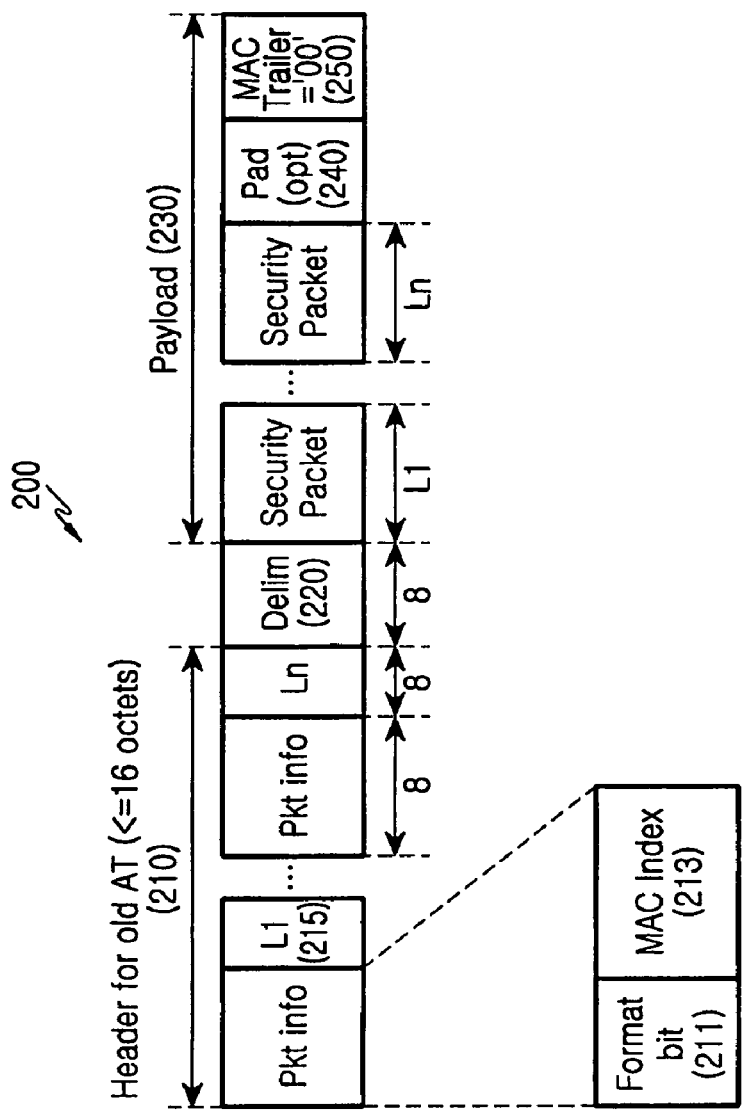
FIG. 2 is a diagram illustrating a structure of a multi-user packet used in the 1×EVDO system.

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Exemplary embodiments of the present invention propose a method and apparatus for efficiently transmitting user packets that increase in number for each individual carrier, using a Multi-User Packet (MUP), without affecting the existing access terminals in the multi-carrier system, and without greatly modifying the physical transmission structure of the existing EVDO system that has already formed the nationwide network.

To this end, exemplary embodiments of the present invention present a method for defining a plurality of multi-user packet received groups and a preamble set corresponding thereto, and assigning a particular multi-user packet received group to each user. Thereafter, exemplary embodiments of the present invention will present a method for transmitting data to an access terminal using the preamble set assigned by an access node and the multi-user packet structure.

A description will first be made of the multi-user packet used in exemplary embodiments of the present invention. In order to support an increased number of multi-carrier access terminals while maintaining the architecture of the conventional system, exemplary embodiments of the present invention define 256 new access terminal identifiers (8-bit MAC IDs) in addition to the 128 access terminal identifiers (7-bit MAC IDs) used conventionally. Therefore, in the method proposed by exemplary embodiments of the present invention, the maximum number of access terminals supportable by one sector is 384.

Because it is assumed herein that the architecture of the conventional system is maintained, it is not possible to additionally assign new physical layer preambles to the newly defined 256 access terminal identifiers in addition to the conventionally defined 128 access terminal identifiers. Therefore, the old Single User Packet (SUP) cannot be used where the receiving access terminals are distinguished with 0th to 127th preambles. Exemplary embodiments of the present invention present an MUP structure for transmitting data to access terminals corresponding to the newly defined 256 access terminal identifiers. The conventional multi-user packet, as it is demodulated and decoded by a plurality of access terminals, is transmitted with an identifier of its actual recipient written in the header part to specify the actual recipient. Exemplary embodiments of the present invention present a new multi-user packet header for specifying the newly defined 256 identifiers.

Figure 3:
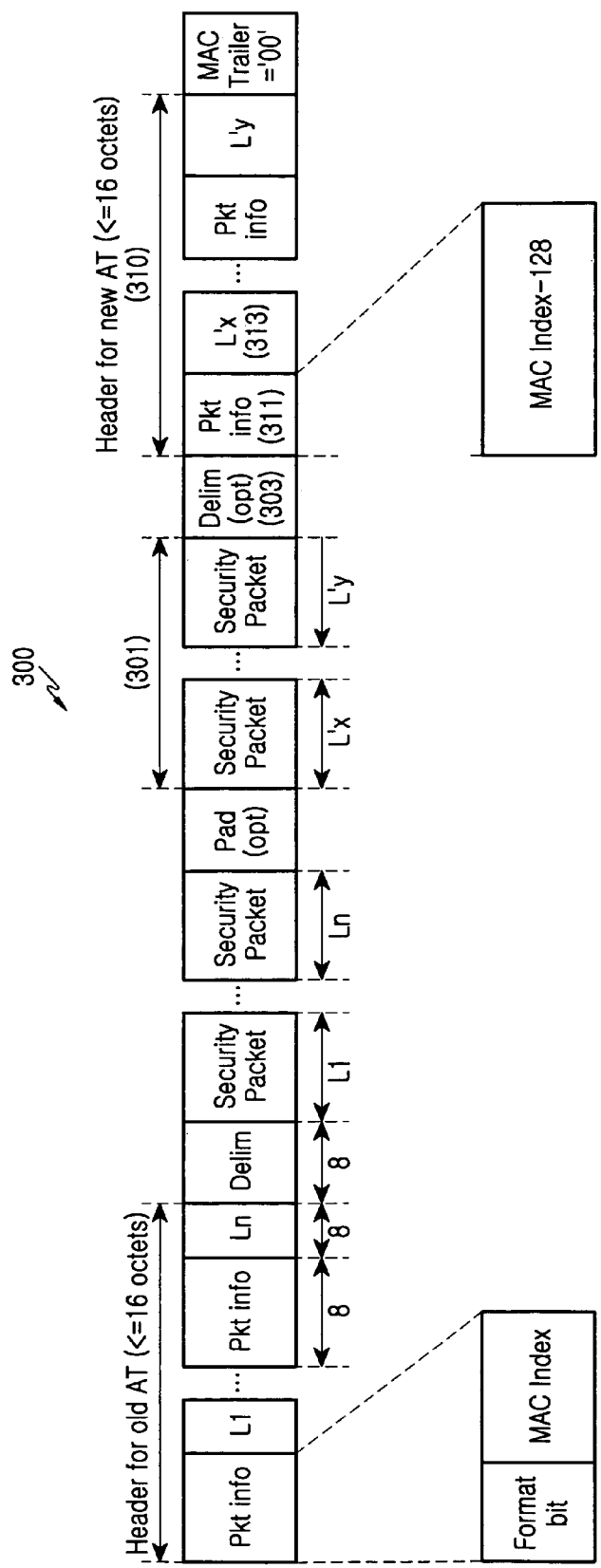
FIG. 3 is a diagram illustrating a format structure of a multi-user packet according to an exemplary embodiment of the present invention.

FIG. 3 is a diagram illustrating a format structure of a multi-user packet 300 according to an exemplary embodiment of the present invention, and includes the old access terminal identifiers and the newly added access terminal identifiers. As shown in FIG. 3, a header 310 for newly defined 256 access terminal identifiers MAC_ID 128 to 384 exists at the end of the multi-user packet 300, and comprises information 311 (value obtained by subtracting 128 from an identifier of an access terminal) indicating an access terminal, a length 313 of a packet of a corresponding access terminal included in the multi-user packet, and a delimiter 303 for distinguishing the header 310 from a part of data 301 of the newly added access terminal.

If data is transmitted for the newly defined 256 access terminal identifiers MAC_ID 128 to 384 using the conventionally defined multi-user packet and preambles assigned thereto, that is, 66th to 70th preambles, every time data is transmitted to one access terminal having an access terminal identifier #128 or higher, all access terminals that transmitted DRC compatible with the multi-user packet format perform an operation of demodulating and decoding the packet. For example, if an access terminal having an identifier #200 has reported DRC compatible with a multi-user packet (1024, 4, 256) and an access node has transmitted the multi-user packet (1024, 4, 256) to the access terminal using a preamble #66 corresponding to the multi-user packet, all access terminals that reported the DRC compatible with the multi-user packet (1024, 4, 256) receive the corresponding packet and perform demodulation and decoding on the received packet, determining that the received packet might be transmitted to themselves. That is, if many access terminals in the sector simultaneously attempt reception every time a packet is transmitted to an access terminal having an identifier #128 or higher, the access terminals suffer unnecessary power waste. Therefore, the present invention proposes a scheme for transmitting data to new multi-carrier access terminals without affecting the conventional access terminals.

According to exemplary embodiments of the present invention, in order to address the above problems, an access node designates a set of preambles to an access terminal that the access terminal will use to receive the multi-user packet. In an exemplary implementation, as a method for designating a set of the preambles, the access node can deliver the set of the preambles along with the access terminal identifier when assigning an access terminal identifier to the access terminal, or can configure the set of the preambles using the newly defined message. In an additional exemplary implementation, there is another method for designating the set of preambles as a session configuration attribute before transmission in a session negotiation process where the access node negotiates with the access terminal on the information necessary for communication.

TABLE 3

| Field | Length (bits) |
|---|---|
| MessageID | 8 |
| {NumForwardChannels occurrences of the following records: | |
| ... | |
| {NumSectorsThisFrequency occurrences of the following records: | |
| TrafficMACIndex | 8 |
| MUPPreamblesIncluded | 1 |
| MUPPreamble1 | 0 or 7 |
| MUPPreamble2 | 0 or 7 |
| MUPPreamble3 | 0 or 7 |
| MUPPreamble4 | 0 or 7 |
| MUPPreamble5 | 0 or 7 |
| } | |
| ... | |
| } | |

Table 3 shows a message for indicating a preamble set for reception of a multi-user packet proposed in exemplary embodiments of the present invention. The preamble set defined in exemplary embodiments of the present invention can be included in a TrafficChannelAssignment message transmitted when an access node assigns a traffic channel to an access terminal or updates an active set of the access terminal, or can be included in a message newly defined for the preamble set.

A MessageID field of a message indicating the preamble set has a value of a message identifier for distinguishing a TrafficChannelAssignment message or a newly defined message from other messages. In addition, the message indicating the preamble set can deliver one access terminal identifier for every forward carrier to an access terminal in each sector for the sectors belonging to the active set of the access terminal. The access terminal identifier is delivered using a TrafficMACIndex field.

The scheme proposed in exemplary embodiments of the present invention can deliver new preamble identifiers (preamble set) used for reception of a multi-user packet in addition to the access terminal identifiers. A MUPPreamblesIncluded field indicates whether the new preamble identifiers proposed by exemplary embodiments of the present invention are included. If the MUPPreamblesIncluded field is set to '1,' the next MUPPreamble1, MUPPreamble2, MUPPreamble3, MUPPreamble4, MUPPreamble5 fields are included in the message. The MUPPreamble1 field indicates a preamble used for transmission of a multi-user packet (128, 4, 256), (256, 4, 256), (512, 4, 256), (1024, 4, 256). The MUPPreamble2 field indicates a preamble used for transmission of a multi-user packet (2048, 4, 128). The MUPPreamble3 field indicates a preamble used for transmission of a multi-user packet (3072, 2, 64). The MUPPreamble4 field indicates a preamble used for transmission of a multi-user packet (4096, 2, 64). The MUPPreamble5 field indicates a preamble used for transmission of a multi-user packet (5120, 2, 64).

In the above exemplary embodiment, an access node transmits a message including five MUPPreamble fields. However, if the access node transmits MUPPreamble1 field to the access terminal in accordance with another exemplary embodiment, the access terminal can use MUPPreamble 2 through MUPPreamble 5 according to a predetermined rule by using the received MUPPreamble 1 field.

TABLE 4

| Attribute | Values | Meaning |
|---|---|---|
| MUPPreamble1 | 0x00 | Preamble group is not used |
| | 0x05~0x3F, 0x48~0x7F | Preamble Index for MUPPreamble1 |
| | All other values | Reserved |
| MUPPreamble2 | 0x00 | Preamble group is not used |
| | 0x05~0x3F, 0x48~0x7F | Preamble Index for MUPPreamble2 |
| | All other values | Reserved |
| MUPPreamble3 | 0x00 | Preamble group is not used |
| | 0x05~0x3F, 0x48~0x7F | Preamble Index for MUPPreamble3 |
| | All other values | Reserved |
| MUPPreamble4 | 0x00 | Preamble group is not used |
| | 0x05~0x3F, 0x48~0x7F | Preamble Index for MUPPreamble4 |
| | All other values | Reserved |
| MUPPreamble5 | 0x00 | Preamble group is not used |
| | 0x05~0x3F, 0x48~0x7F | Preamble Index for MUPPreamble5 |
| | All other values | Reserved |

Table 4 shows an exemplary method of delivering a preamble set for reception of a multi-user packet proposed in exemplary embodiments of the present invention, using a configuration attribute negotiated by the access node and the access terminal in a session negotiation process.

Exemplary embodiments of the present invention define additional configuration attributes of MUPPreamble1, MUPPreamble2, MUPPreamble3, MUPPreamble4, and MUPPreamble5. The configuration attribute MUPPreamble1 indicates a preamble used for transmission of a multi-user packet (128, 4, 256), (256, 4, 256), (512, 4, 256), (1024, 4, 256). The configuration attribute MUPPreamble2 indicates a preamble used for transmission of a multi-user packet (2048, 4, 128). The configuration attribute MUPPreamble3 indicates a preamble used for transmission of a multi-user packet (3072, 2, 64). The configuration attribute MUPPreamble4 indicates a preamble used for transmission of a multi-user packet (4096, 2, 64). The configuration attribute MUPPreamble5 indicates a preamble used for transmission of a multi-user packet (5120, 2, 64). If a value of each configuration attribute is '0x00', it means nonuse of the preamble set for reception of the multi-user packet proposed in exemplary embodiments of the present invention. The access terminal and the access node can determine a desired preamble identifier among '0x5'~'0x3F' and '0x48'~'0x7F' as the configuration attribute value.

In the above exemplary embodiment, an access node and an access terminal defines five configuration attributes. However, if the access node and the access terminal define MUPPreamble 1 in accordance with another exemplary embodiment, the access terminal can use MUPpreamble 2 through MUPpreamble 5 according to a predetermined rule by using the MUPpreamble 1.

If a particular access terminal receives the preamble set, the access terminal disregards the packet transmitted using the preambles #66 to #70 that were used for transmission of the conventional multi-user packet (MUP). If a preamble belonging to a newly received preamble set is detected instead, the access terminal attempts demodulation and decoding on the forward packet. As another method, upon receipt of the preamble set, the access terminal can attempt to receive both the packet transmitted using preambles #66 to #70 used for transmission of the conventional multi-user packet and the packet transmitted using preambles belonging to the newly assigned preamble set.

The access node that indicated the preamble set can transmit data for the corresponding access terminal with a multi-user packet using the indicated new preamble set, instead of transmitting the data using preambles #66 to #70 used for transmission of the conventional multi-user packet. As further another method, the access node that indicated the preamble set can transmit data for the corresponding access terminal with a multi-user packet using one of both of the indicated new preamble sets, together with the preambles #66 and #67 used for transmission of the conventional multi-user packet.

The access node can designate more than one preamble sets taking into account its load condition or the number of access terminals having the identifier #128 or higher. The access node can assign the preamble set to an access terminal having an identifier #128 or lower, or an access terminal having an identifier #128 or higher.

The access terminal, which is assigned the preamble set, monitors whether multi-user packet formats compatible with its reported forward rate information (DRC) and preambles corresponding thereto have arrived. As described in Table 2, for particular rate information (DRC), a plurality of multi-user packet formats can be mapped thereto, and the access terminal should operate such that it detects all of the preambles corresponding to each of them.

As another method, in order to reduce a preamble detection load of an access terminal (that is, to reduce the number of preambles that the access terminal detects), the access terminal can monitor only some of the multi-user packet formats compatible with the transmitted rate information or a multi-user packet format with the highest rate, and the preamble corresponding thereto. For example, an access terminal that reported DRC 5 can operate such that it should receive only the preamble corresponding to (2048, 4, 128) among the multi-user packet formats mapped thereto. The access node and the access terminal can determine one of the two operations using the message or the configuration attribute.

TABLE 5

| | |
|---|---|
| TrafficMACIndex | 8 |
| MUPPreamblesIncluded | 1 |
| UseBiggestMUP | 0 or 1 |
| MUPPreamble1 | 0 or 7 |
| MUPPreamble2 | 0 or 7 |
| MUPPreamble3 | 0 or 7 |
| MUPPreamble4 | 0 or 7 |
| MUPPreamble5 | 0 or 7 |

Table 5 shows an exemplary message structure indicating a relationship between the forward rate information and the detected preamble proposed in exemplary embodiments of the present invention. In Table 5, an added UseBiggestMUP field is a field for instructing an access terminal to detect only the biggest multi-user packet format compatible with rate information and its associated preamble when the access terminal reports the corresponding rate information. Therefore, when this field has a value of '0', the access terminal attempts to detect only the biggest multi-user packet format compatible with its reported forward rate information and its associated preamble, and if this field has a value of '0', the access terminal attempts to detect all multi-user packet formats compatible with the forward rate information and their associated preambles.

TABLE 6

| Attribute | Values | Meaning |
|---|---|---|
| UseBiggestMUP | 0x00 | Detect every MUP preambles |
| | 0x01 | Detect the biggest MUP compatible to a DRC |
| | All other values | Reserved |

Table 6 shows an exemplary configuration attribute indicating a relationship between the forward rate information and the detected preamble proposed in exemplary embodiments of the present invention. In Table 6, an added configuration attribute UseBiggestMUP is a configuration attribute for instructing an access terminal to detect only the biggest multi-user packet format compatible with the rate information and its associate preamble when the access terminal reports the corresponding rate information. Therefore, when this configuration attribute has a value of '0x01', the access terminal attempts to detect only the biggest multi-user packet format compatible with its reported forward rate information and its associated preamble, and if this configuration attribute has a value of '0x00', the access terminal attempts to detect all multi-user packet formats compatible with the forward rate information and their associated preambles.

Unlike the exemplary messages of Table 5 and Table 6, an alternative message can be configured such that the access terminal and the access node detect some of a plurality of multi-user packet formats compatible with the forward rate information reported by the access terminal and a plurality of preambles corresponding thereto.

In exemplary embodiments of the present invention, the access node assigns preamble groups to the access terminals in the following manner.

If the number of access terminal identifiers in use in a sector is less than or equal to 128, the access node assigns an unused access terminal identifier #128 or lower for a new multi-carrier user, and performs data communication using a single user packet corresponding to the identifier and a multi-user packet that uses predefined preambles #66 to #70.

If there is a need for an access terminal identifier higher than #128 due to an increase in the number of access terminals, the access node assigns new preamble groups (for example, #40, #41, #42, #43, #44) and new identifiers higher than #128 (for example #145 to #150) proposed in exemplary embodiments of the present invention to some conventional multi-carrier users assigned identifiers lower than #128 (for example, multi-carrier users assigned identifiers #40 to #45). In this case, the conventionally assigned identifiers #45 to #50 can be used again for the old access terminals not supporting the multi-carrier system.

If there is a new multi-carrier access terminal requiring a new identifier, the access node assigns an identifier higher than #128 and one of the above-assigned preamble groups #140 to #150 to the access terminal.

If the number of access terminals continues to increase, the access node assigns new preamble groups (for example, #80, #81, #82, #83, #84) and new identifiers higher than #128 (for example, #180 to #190) to other multi-carrier users assigned identifiers lower than #128 (for example, multi-carrier users assigned #80 to #90). The conventionally assigned identifiers #85 to #90 can be used again for the old access terminals not supporting the multi-carrier system.

With reference to the accompanying drawings, a description will now be made of an operation of an access terminal assigned a new preamble group proposed in exemplary embodiments of the present invention, and an operation of an access node.

Figure 4:
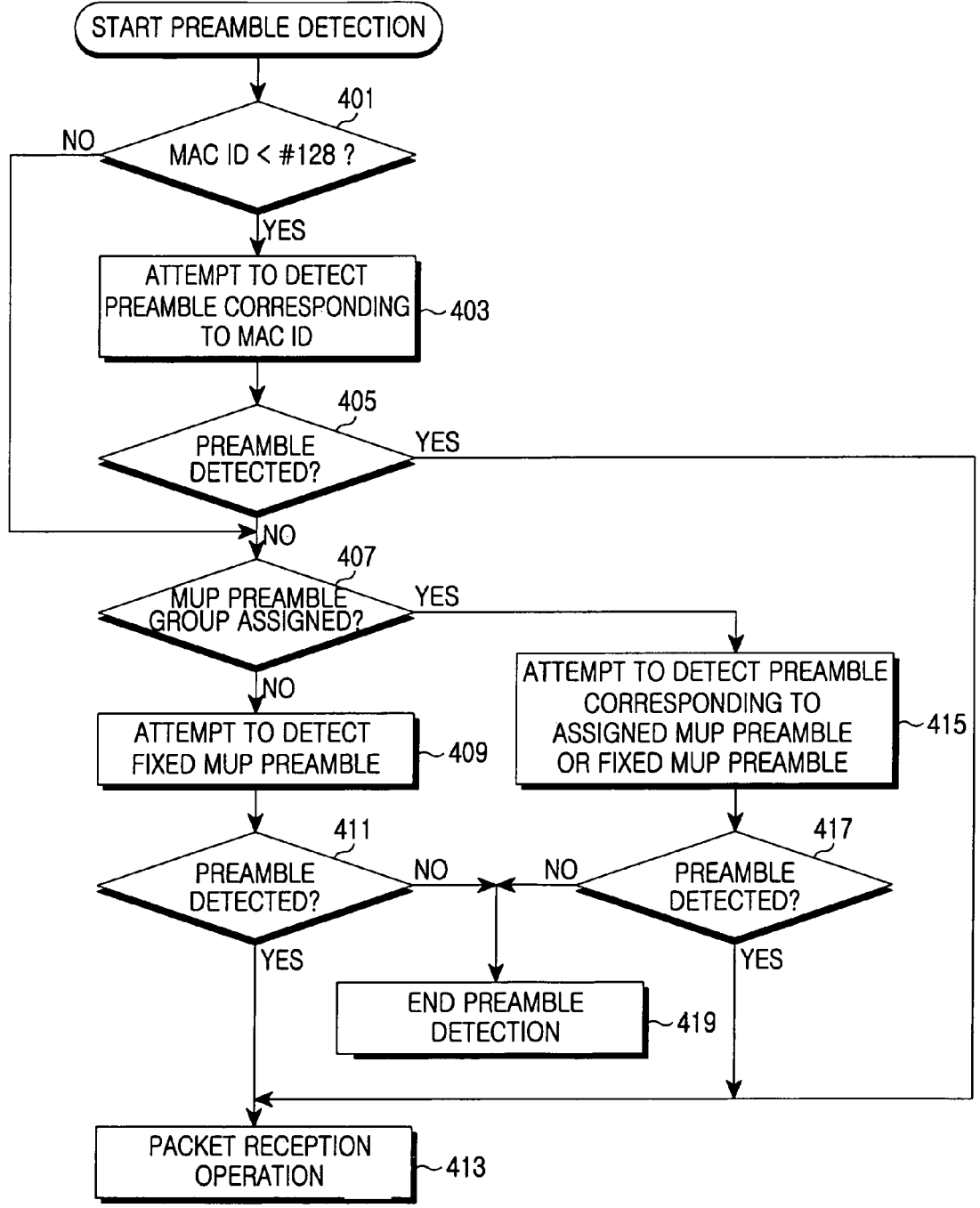
FIG. 4 is a flowchart illustrating a preamble detection operation in an access terminal according to an exemplary embodiment of the present invention.

FIG. 4 is a flowchart illustrating a preamble detection operation of an access terminal assigned a preamble group for a multi-user packet according to an exemplary embodiment of the present invention.

Referring to FIG. 4, an access terminal, as it starts preamble detection, determines in step 401 whether an identifier assigned thereto is less than #128. If the assigned identifier is less than #128, the access terminal attempts to detect a preamble corresponding to the assigned identifier in step 403. If the access terminal detects the corresponding preamble in step 405, it proceeds to step 413 where it performs a packet reception operation, considering that there is a single user packet that has arrived at the access terminal itself.

If the assigned identifier is higher than or equal to #128 in step 401, or if the access terminal has failed to detect the corresponding preamble in step 405, the access terminal determines in step 407 whether it has been assigned a preamble group for a multi-user packet (MUP) proposed in exemplary embodiments of the present invention. If the access terminal has failed to be assigned the preamble group, the access terminal proceeds to step 409 where it attempts to detect preambles (preambles #66 to #70) used for transmission of the conventional fixed multi-user packet. Thereafter, if the access terminal succeeds in detecting the preamble in step 411, the access terminal proceeds to step 413 where it performs a packet reception operation, considering that there is a multi-user packet that has arrived at the access terminal itself. However, if the access terminal fails in preamble detection in step 411, the access terminal proceeds to step 419 where it ends the preamble detection operation.

If the access terminal has been assigned a preamble group for the multi-user packet proposed in exemplary embodiments of the present invention in step 407, the access terminal attempts to detect preambles belonging to the assigned preamble group or preambles used for transmitting the conventional multi-user packet (MUP) in step 415. If the access terminal has succeeded in preamble detection in step 417, the access terminal proceeds to step 413 where it performs a packet reception operation, considering that there is a multi-user packet (MUP) that has arrived at the access terminal itself. However, if the access terminal has failed in preamble detection in step 417, the access terminal proceeds to step 419 where it ends the preamble detection operation.

Figure 5:
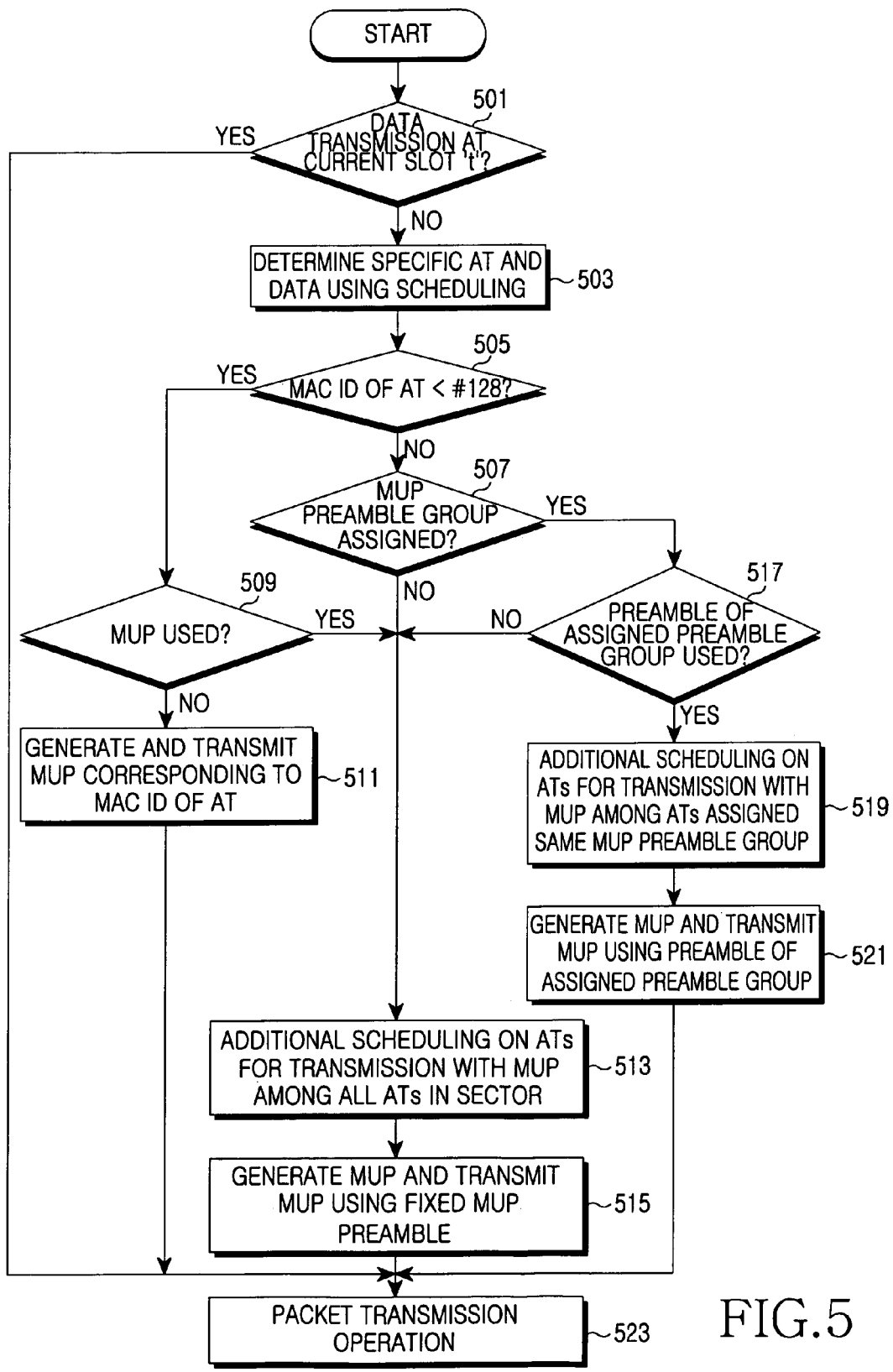
FIG. 5 is a flowchart illustrating a data transmission method in an access node according to an exemplary embodiment of the present invention.

FIG. 5 is a flowchart illustrating a data transmission method performed by an access node according to an exemplary embodiment of the present invention. In this operation, the access node schedules and transmits data to access terminals assigned a preamble group for a multi-user packet, and the other access terminals.

Referring to FIG. 5, an access node determines in step 501 whether it is transmitting or retransmitting specific data at the current slot 't.' If there is a packet that the access node is now transmitting, the access node proceeds to step 523 where it transmits the corresponding packet. However, if there is no packet that the access node is now transmitting in step 501, the access node determines in step 503 an access terminal (AT) to which its scheduler will newly transmit data through scheduling, and also determines a data rate of the access terminal. Thereafter, the access node determines in step 505 whether an identifier of the corresponding access terminal is lower than #128. If an identifier of the corresponding access terminal is lower than #128, the access node determines in step 509 whether it will transmit data for the corresponding access terminal using a multi-user packet (MUP). If the access node determines to use a single user packet in step 509, the access node generates a single user packet including data for the corresponding access terminal, and transmits the single user packet using a preamble of the single user packet corresponding to an identifier of the corresponding access terminal in step 511. However, if the access node determines to use a multi-user packet (MUP) in step 509, the access node additionally schedules the data to be additionally transmitted using the multi-user packet (MUP), for all access terminals in the sector, in step 513. Thereafter, in step 515, the access node generates a multi-user packet (MUP) including the corresponding data, and transmits the multi-user packet (MUP) using preambles used for transmitting the conventional multi-user packet.

If an identifier of the corresponding access terminal is higher than or equal to #128 in step 505, the access node determines in step 507 whether it has assigned a preamble group for a multi-user packet (MUP) proposed in exemplary embodiments of the present invention to the corresponding access terminal. If the access node has not assigned the preamble group, the access node proceeds to step 513 where it schedules the data to be additionally transmitted using the multi-user packet (MUP), for all access terminals in the sector. Thereafter, in step 515, the access node generates a multi-user packet (MUP) including the corresponding data, and transmits the multi-user packet (MUP) using preambles used for transmitting the conventional multi-user packet (MUP).

If the access node has assigned the preamble group to the corresponding access terminal in step 507, the access node determines in step 517 whether it will transmit the multi-user packet (MUP) using the preamble of the preamble group proposed in exemplary embodiments of the present invention. If the access node determines to use the preamble of the preamble group proposed in exemplary embodiments of the present invention in step 517, the access node schedules the data to be additionally transmitted using the multi-user packet (MUP), for the access terminals assigned the same preamble group, in step 519. Thereafter, in step 521, the access node generates a multi-user packet (MUP) including the corresponding data and transmits the multi-user packet (MUP) using preambles belonging to the preamble group.

If the access node determines not to use the preamble group proposed in exemplary embodiments of the present invention in step 517, the access node proceeds to step 513 where it schedules the data to be additionally transmitted using the multi-user packet (MUP), for all access terminals in the sector. Thereafter, in step 515, the access node generates a multi-user packet including the corresponding data, and transmits the multi-user packet using preambles used for transmitting the conventional multi-user packet.

Figure 6:
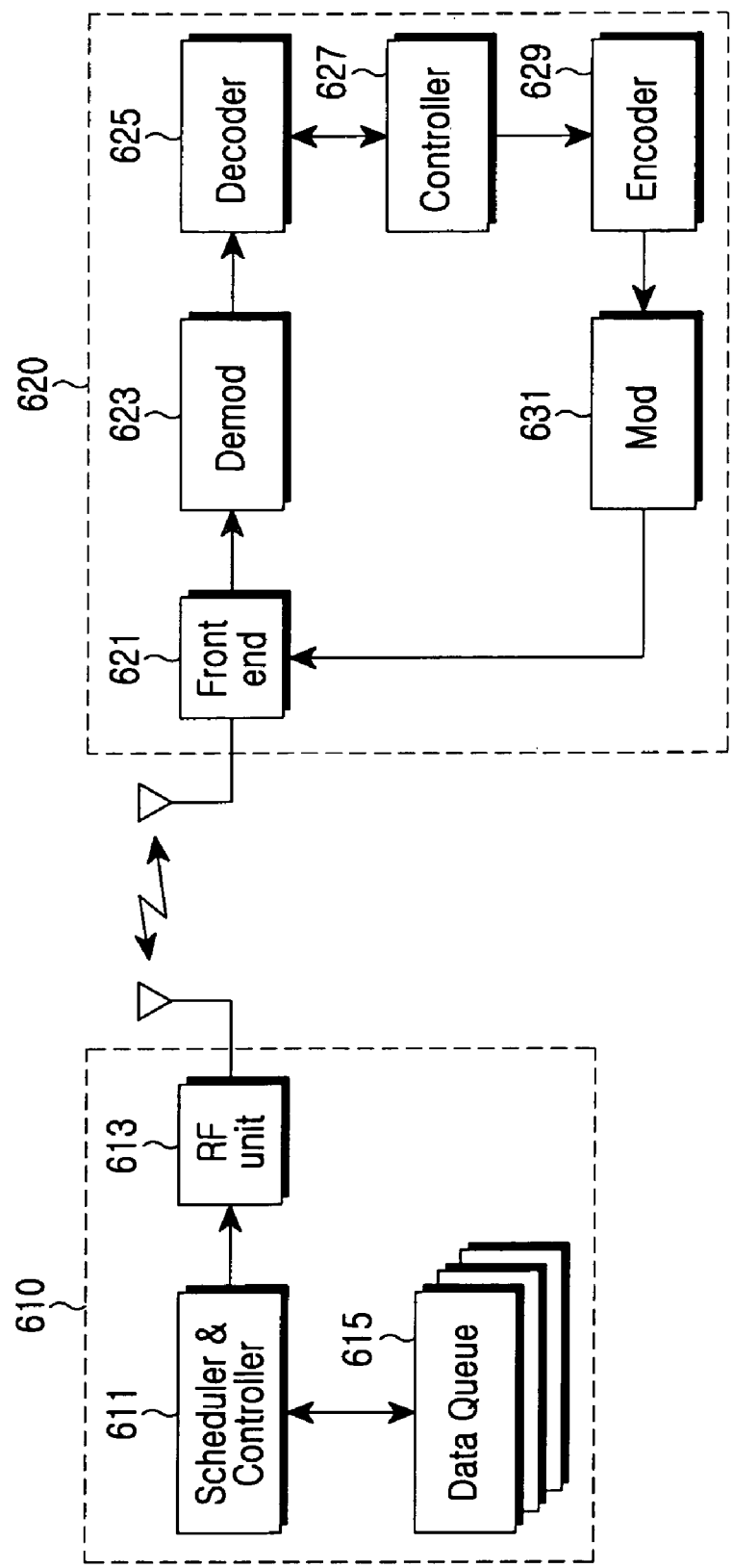
FIG. 6 is a block diagram of an access node and an access terminal according to an exemplary embodiment of the present invention.

FIG. 6 is a block diagram of an access node 610 and an access terminal 620 according to an exemplary embodiment of the present invention.

Referring to FIG. 6, an access node 610, receiving DRC information, includes a scheduler and controller 611, a radio frequency (RF) unit 613, and a data queue 615. An access terminal 620, transmitting the DRC information, includes a transceiver (or front-end unit) 621, a demodulator 623, a decoder 625, a controller 627, an encoder 629, and a modulator 631.

The data queue 615 of the access node 610 stores data received from an upper node in a queue for each individual access terminal or service. The scheduler and controller 611 selectively controls the stored data for a specific user or a specific queue taking into account DRC information (that is, forward channel condition) transmitted by access terminals, service attribute, and fairness. Herein, the scheduler performs a scheduling operation according to exemplary embodiments of the present invention, and the controller controls an operation of transmitting data using a preamble group assigned for each individual access terminal according to exemplary embodiments of the present invention. The RF unit 613 transmits the selectively controlled data signal to the access terminal 620.

In the access terminal 620, the demodulator 623 demodulates the signal received via the transceiver 621, and the decoder 625 decodes the demodulated signal, and provides the decoded signal to the controller 627. If the signal from the access node 610 is configured in the preamble group according to exemplary embodiments of the present invention, the access terminal 620 performs the operation shown in FIG. 5. If there data to transmit, the access terminal 620 encodes the corresponding data with the encoder 629, modulates the encoded data with the modulator 631, and transmits the modulated data to the access node 610 via the transceiver 621.

To assist the access node 610 in performing scheduling, the access terminal 620 measures strength of a pilot channel transmitted from the access node 610, determines a DRC, that is, data rate, at which data can be received from the corresponding access node 610, and transmits the determined DRC to the access node 610 via the transceiver 621.

As can be understood from the foregoing description, exemplary embodiments of the present invention can transmit data to an increased number of users without affecting the existing access terminals when the multi-carrier transmission system additionally uses access terminal identifiers.

While the invention has been particularly shown and described with reference to a certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A method for transmitting data to access terminals by an access node in a Code Division Multiple Access (CDMA) system, the method comprising:
    setting information on a preamble identifier for transmitting a multi-user packet (MUP) to an access terminal;
    providing the information on the preamble identifier for transmitting the MUP to the access terminal to the access terminal in a session negotiation process;
    checking a data rate control (DRC) information received from the access terminal and determining a packet format for transmitting to the access terminal by using the checked DRC information; and
    transmitting the MUP to the access terminal using the set information on the preamble identifier to the access terminal if the determined packet format is a multi-user packet format.

2. The method of claim 1, wherein the information on the preamble identifier is to indicate to the access terminal not to perform demodulation and decoding on received MUPs using preambles other than a preamble corresponding to the preamble identifier.

3. The method of claim 1, wherein a number of access terminals supportable by one sector is larger than 128.

4. The method of claim 1, further comprising:
    assigning a MAC ID of 128 or higher to the access terminal.

5. The method of claim 4, wherein the MUP comprises a MUP header added at the end of the MUP.

6. The method of claim 5, wherein the MUP header comprises the MAC ID and a packet length of the access terminal.

7. The method of claim 6, wherein a delimiter for distinguishing the MUP header from data of the access terminal.

8. The method of claim 1, further comprising:
    providing an attribute value indicating a relationship between the DRC information and the preamble identifier in the session negotiation process.

9. The method of claim 1, wherein the step of transmitting the MUP comprising:
    scheduling a data to be transmitted using the MUP for access terminals assigned the same preamble identifier; and
    generating the MUP including the data and transmitting the MUP.

10. An access node of a Code Division Multiple Access (CDMA) system, the access node comprising:
    a controller for setting information on a preamble identifier for transmitting a multi-user packet (MUP) to a access terminal, checking data rate control information (DRC) received from the access terminal and determining a packet format for transmitting to the access terminal by using the checked DRC information;
    a radio frequency (RF) unit for transmitting the information on the preamble identifier to the access terminal in a session negotiation process and transmitting the MUP using the set information on the preamble identifier to the access terminal if the determined packet format is a multi-user packet format.

11. The access node of claim 10, wherein the information on the preamble identifier is to indicate to the access terminal not to perform demodulation and decoding on received MUPs using preambles other than a preamble corresponding to the preamble identifier.

12. The access node of claim 10, wherein a number of access terminals supportable by one sector is larger than 128.

13. The access node of claim 10, wherein the controller assigns a MAC ID of 128 or higher to the access terminal.

14. The access node of claim 13, wherein the MUP comprises a MUP header added at the end of the MUP.

15. The access node of claim 14, wherein the MUP header comprises the MAC ID and a packet length of the access terminal.

16. The access node of claim 15, wherein a delimiter for distinguishing the MUP header from data of the access terminal.

17. The access node of claim 10, the RF unit transmits an attribute value indicating a relationship between the DRC information and the preamble identifier in the session negotiation process.

18. The access node of claim 10, further comprising:
    a scheduler for scheduling a data to be transmitted using the MUP for access terminals assigned the same preamble identifier; and
    wherein the RF unit transmits the MUP including the data.

19. A method for receiving data by an access terminal in a Code Division Multiple Access (CDMA) system, the method comprising:
    receiving, by the access terminal, information on a preamble identifier for receiving a multi-user packet (MUP) from an access node in a session negotiation process;
    determining the preamble identifier for receiving the MUP by using the received information on the preamble identifier and a data rate control(DRC) information;
    detecting whether there is at least one preamble assigned to the access terminal by using the determined preamble identifier upon receipt of the MUP from the access node; and
    decoding the MUP of which the preamble is detected.

20. The method of claim 19, wherein the information on the preamble identifier is to indicate to the access terminal not to perform demodulation and decoding on received MUPs using preambles other than a preamble corresponding to the preamble identifier.

21. The method of claim 19, wherein the access terminal is assigned a MAC ID of 128 or higher from the access node.

22. The method of claim 19, wherein the MUP comprises a MUP header added at the end of the MUP.

23. The method of claim 22, wherein the MUP header comprises the MAC ID and a packet length of the access terminal.

24. The method of claim 23, wherein a delimiter for distinguishing the MUP header from data of the access terminal.

25. The method of claim 19, further comprising:
receiving an attribute value indicating a relationship between the DRC information and the preamble identifier in the session negotiation process from the access node.

26. The method of claim 25, wherein the access terminal detects only the biggest preamble or all preambles according to the attribute value.

27. An access terminal of a Code Division Multiple Access (CDMA) system the access terminal comprising:
a radio frequency (RF) unit for transmitting data rate control information (DRC) to an access node, and receiving, from the access node, information on a preamble identifier for receiving a multi-user packet (MUP) in a session negotiation process;
a controller for controlling a DRC to be transmitted to the access nod, determining the preamble identifier for receiving the MUP by using the received information on the preamble identifier and detecting whether there is a preamble assigned to the access terminal by using the determined preamble identifier; and
a decoder for decoding the MUP received from the access node when the preamble is detected.

28. The access terminal of claim 27, wherein the information on the preamble identifier is to indicate to the access terminal not to perform demodulation and decoding on received MUPs using preambles other than a preamble corresponding to the preamble identifier.

29. The access terminal of claim 27, wherein the MUP comprises a MUP header added at the end of the MUP.

30. The access terminal of claim 29, wherein the MUP header comprises the MAC ID and a packet length of the access terminal.

31. The access terminal of claim 29, wherein a delimiter for distinguishing the MUP header from data of the access terminal.

32. The access terminal of claim 27, wherein the RF unit receives an attribute value indicating a relationship between the DRC information and the preamble identifier in the session negotiation process from the access node.

33. The access terminal of claim 32, wherein the controller detects only the biggest preamble or all preambles according to the attribute value.

* * * * *